United States Patent [19]
Ushiyama

[11] Patent Number: 5,825,537
[45] Date of Patent: Oct. 20, 1998

[54] SPHERICAL BINOCULAR

[75] Inventor: Takashi Ushiyama, Tokyo, Japan

[73] Assignee: Muti Work Corporation, Aichi-ken, Japan

[21] Appl. No.: 561,047

[22] Filed: Nov. 20, 1995

[30]      Foreign Application Priority Data

Nov. 22, 1994  [JP]  Japan ..................................... 6-015545

[51] Int. Cl.$^6$ .............................. G02B 23/00; G02B 7/02
[52] U.S. Cl. .......................... 359/408; 359/409; 359/480; 359/817
[58] Field of Search ..................................... 359/404–408, 359/480–482, 808–811, 815–818; D16/132–133, 900

[56]              References Cited

U.S. PATENT DOCUMENTS

| | | | |
|---|---|---|---|
| D. 374,680 | 10/1996 | Yang et al. ............................ | D16/133 |
| D. 375,968 | 11/1996 | Oshiyama ............................. | D16/133 |
| 3,397,935 | 8/1968 | Natsume ................................ | 359/413 |
| 4,770,519 | 9/1988 | Jacques ................................. | 359/408 |
| 4,913,538 | 4/1990 | Wakayama et al. .................... | 359/408 |
| 5,087,991 | 2/1992 | Miner ..................................... | 359/819 |

OTHER PUBLICATIONS

Five(05) Pictures of the binocular provided by the McDonald Fast Food Restaurant.

*Primary Examiner*—Thong Nguyen
*Attorney, Agent, or Firm*—Knobbe, Martens Olson & Bear, LLP

[57]             ABSTRACT

A spherical binocular capable of being conveniently portable and suitable for use for watching a game in a baseball stadium, a soccer ground or the like. Two hemispherical shells are foldably or pivotally connected together into a spherical configuration. The hemispherical shells each are formed at a center thereof with an ocular through-hole, in which an ocular concave lens is fitted. A front plate is fitted in a front opening edge of each of the shells and formed at a center thereof with an objective opening, in which an objective convex lens is arranged so as to be aligned with the objective convex lens. When the hemispherical shells are folded over each other to align the front opening edges with each other, a holding pawl and holding groove of one of the hemispherical shells are fittedly engaged with a holding groove and a holding pawl of the other of the hemispherical shells, respectively. Inward forcing of the holding pawl of each of the hemispherical shells thus folded permits the holding pawl to be released from engagement with the holding groove for use.

7 Claims, 6 Drawing Sheets

SPHERICAL BINOCULAR

BACKGROUND OF THE INVENTION

This invention relates to a spherical binocular, and more particularly to a spherical binocular which is conveniently portable and suitable for use for watching a game in a baseball stadium, soccer grounds or the like.

A number of conveniently portable binoculars formed into various shapes such as a cube, a flat box-like shape and the like have been conventionally proposed in the art.

However, each of the conventional binoculars fails to exhibit satisfactory carrying and/or storage characteristics. Also, they fail to exhibit satisfactory optical characteristics and also fail to permit good viewing of players in motion. Further, foldable hinges and meshing teeth of the binoculars are outwardly projected, resulting in being hard to hold.

SUMMARY OF THE INVENTION

The present invention has been made in view of the foregoing disadvantages of the prior art.

Accordingly, it is an object of the present invention to provide a spherical binocular which is capable of being varied in configuration in use and during carrying, to thereby exhibit originality and novelty.

It is another object of the present invention to provide a spherical binocular which is capable of permitting good viewing of players in motion while being convenient for use and exhibiting satisfactory optical characteristics.

It is a further object of the present invention to provide a spherical binocular which eliminates outward projecting foldable hinges and meshing teeth, to thereby render a smooth contour, resulting in being easily held in the hands.

It is still another object of the present invention to provide a spherical binocular which is compact or small enough to be convenient for carrying and storage.

A spherical binocular of the present invention is conveniently portable and suitable for use for watching a game in a baseball stadium, soccer grounds or the like. Two hemispherical shells are foldably or pivotably connected together into a spherical configuration. The hemispherical shells each are formed at a center thereof with an ocular through-hole, in which an concave ocular lens is fitted. A front plate is fitted in a front opening edge of each of the shells and formed at a center thereof with an objective opening, in which an objective convex lens is arranged so as to be aligned with the objective convex lens. When the hemispherical shells are folded over each other to align the front opening edges with each other, a holding pawl and holding groove of one of the hemispherical shells are fittedly engaged with a holding groove and a holding pawl of the other of the hemispherical shells, respectively. Inward pressure on the holding pawl of each of the hemispherical shells thus folded permits the holding pawl to be released from engagement with the holding groove for use. In a preferred embodiment of the present invention, the hinge is formed with insertion through-holes through which a string for holding or carrying of the spherical binocular is inserted.

These objectives and many other attendant advantages of the present invention will be readily appreciated through reference to the following detailed description considered in connection with the accompanying drawings in which like reference numerals designate like or corresponding parts throughout.

DETAILED DESCRIPTION OF THE PREFERRED EMBODIMENT

Figure 1:
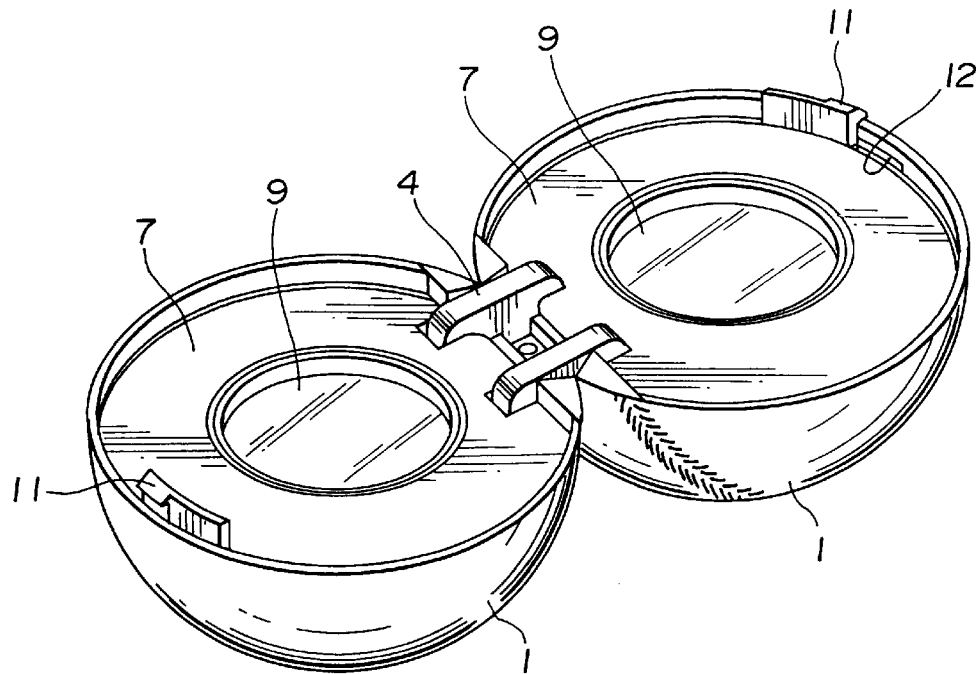
FIG. 1 is a perspective view showing an embodiment of a spherical binocular according to the present invention.
Figure 2:
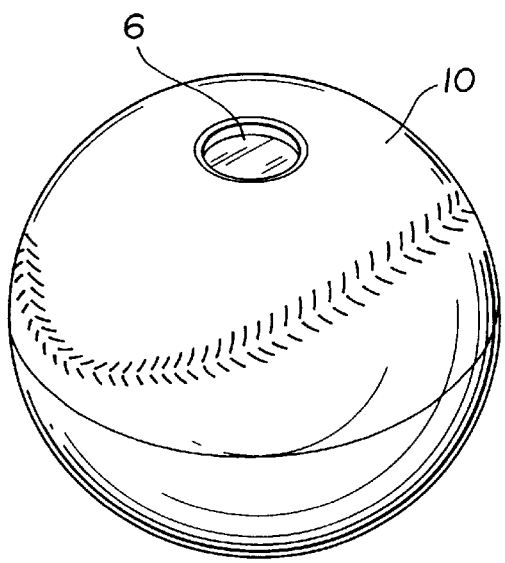
FIG. 2 is a perspective view of the spherical binocular shown in FIG. 1, which is folded for carrying or storage.
Figure 3:
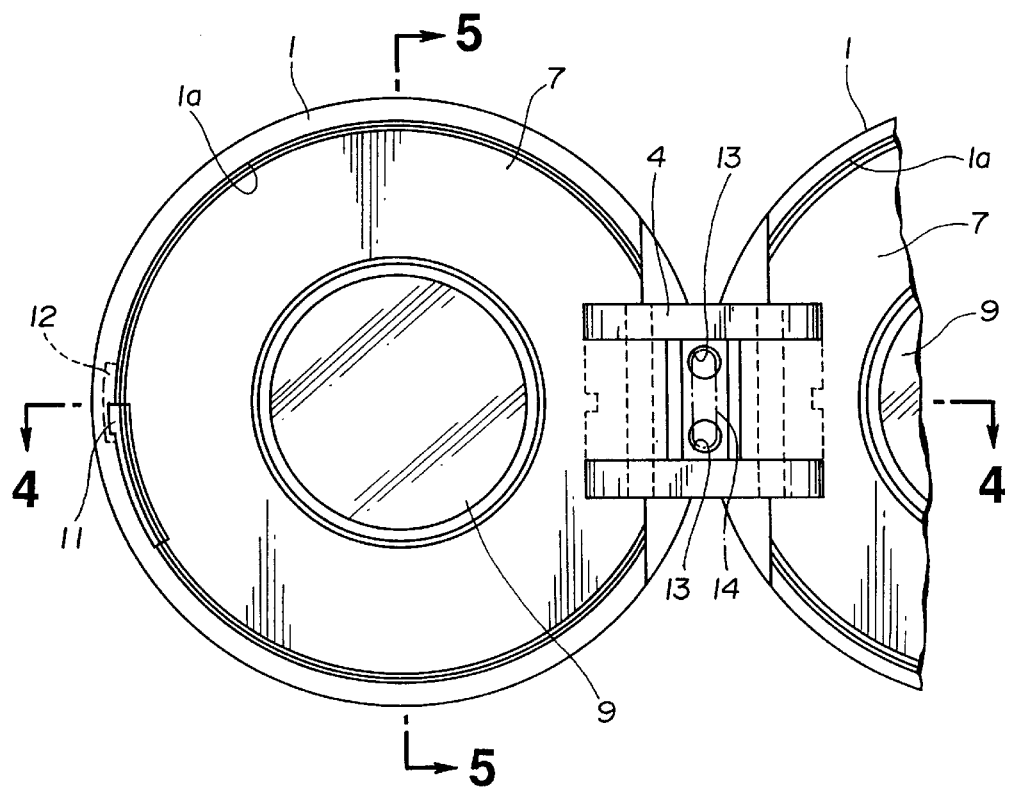
FIG. 3 is a partial elevation view of the spherical binocular indicated in FIG. 1.
Figure 4:
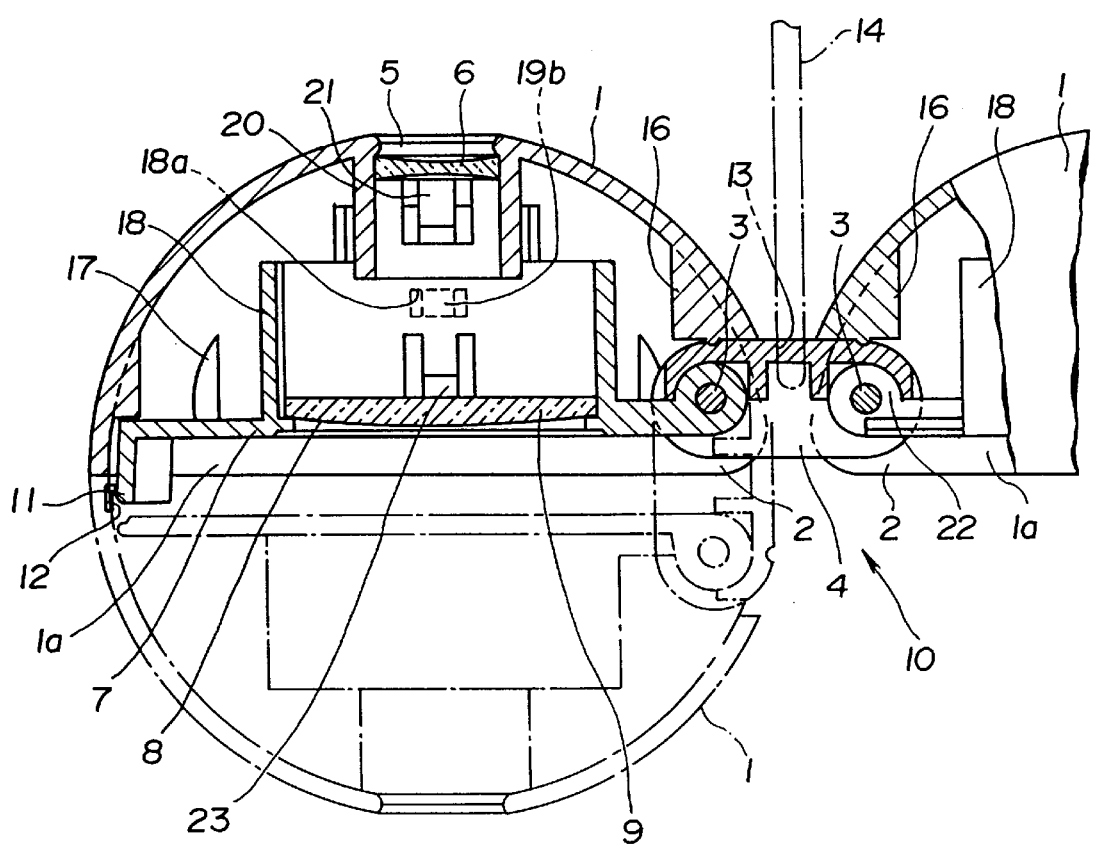
FIG. 4 is a sectional view taken along line A—A of FIG. 3.
Figure 5:
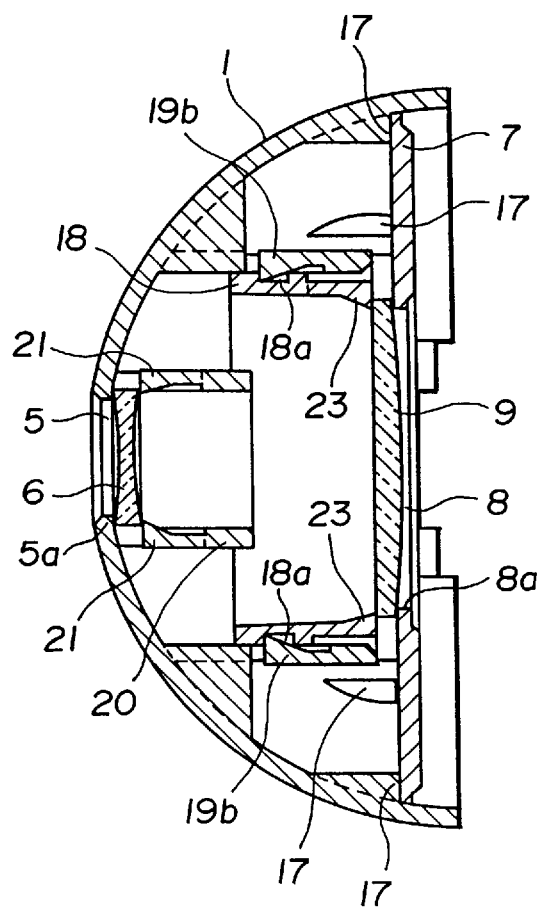
FIG. 5 is a sectional view taken along line B—B of FIG. 3.

In accordance with the present invention, a spherical binocular is provided. The spherical binocular includes a pair of hemispherical shells each including a front opening edge and an outer periphery and having a rectangular groove formed by cutting a portion thereof extending from the front opening edge to the outer periphery, a support shaft arranged in each of the rectangular grooves so as to laterally extend therein, and a hinge having both sides each received in each of the rectangular grooves and pivotally mounted on each of the support shafts, resulting in foldably connecting the hemispherical shells to each other. The hemispherical shells each are formed at a central portion thereof with an ocular through-hole. The hemispherical binocular also includes an ocular concave lens arranged in each of the ocular through-holes and a front plate fittedly arranged in the front opening edge of each of the hemispherical shells. The front plates each are formed at a central portion thereof with an objective opening. Further, the hemispherical binocular includes an objective convex lens arranged in each of the objective openings. The objective convex lens and ocular concave lens are arranged so as to align with each other. The hemispherical shells each are provided at the front opening edge with a holding pawl so as to be outwardly projected therefrom and on an inside of the front opening edge with a holding groove. Thus, folding of the pivotally connected two hemispherical shells over each other in a manner to align the front opening edges with each other permits the holding pawl and holding groove of one of the hemispherical shells to be respectively fittedly engaged with the holding groove and holding pawl of the other of the hemispherical shells for storage or carrying, whereas inward pressure on the holding pawl of each of the hemispherical shells thus folded permits the holding pawl to be released from engagement with the holding groove for use.

In a preferred embodiment of the present invention, the hemispherical shells each are provided on a portion of an inner surface thereof in proximity to the front opening edge with front plate support projections in a manner to be spaced from each other at predetermined intervals, to thereby support thereon the front plate fitted in said hemispherical shell, and the hemispherical shells each are provided on the inner surface thereof with a pair of support cylinder support seats of an arcuate shape so as to be positioned behind the front plate support projections based on the front opening edge; wherein the support cylinder support seats each support an objective convex lens support cylinder thereon to hold it on a rear surface of the front plate, the objective convex lens is supported in the objective convex lens support cylinder, and the support cylinder support seats each include a support cylinder support surface element of an arcuate shape and a support cylinder holding pawl which are arranged for fixedly supporting said objective convex lens support cylinder. Also, the hemispherical shells each are provided on the inner surface thereof with an ocular concave lens support cylinder in a manner to be inwardly projected therefrom and so as to be aligned with the ocular through-hole, wherein the ocular concave lens support cylinder is formed into an inner diameter corresponding to said ocular through-hole and the ocular concave lens support cylinder is provided therein with concave lens holding pawls for holding the ocular concave lens in the ocular concave lens support cylinder.

In a preferred embodiment of the present invention, the rectangular groove is formed during molding of the hemispherical shell and the rectangular groove is formed at an intermediate portion thereof with a projection including a projecting distal end for adjustment.

In a preferred embodiment of the present invention, the holding pawl is arranged so as to be outwardly projected from an outer periphery of the front plate and the holding pawl of one of the hemispherical shells is arranged so as to be alternated with the holding pawl of the other of the hemispherical shells.

In a preferred embodiment of the present invention, the front plate is formed into a diameter sufficient to permit the front plate to be snugly fitted in the front opening edge and integrally provided at a part of a periphery thereof with a bearing section formed with a bearing hole in which the support shaft is supported. The objective convex lens support cylinder is arranged on a rear side of the front plate so as to be inwardly projected therefrom, the hemispherical shell is formed on the inner surface thereof with support cylinder holding pawls and the objective convex lens support cylinder is provided on an outer surface thereof with holding grooves so as to positionally correspond to the support cylinder holding pawls, and the objective convex lens support cylinder is provided on an inner surface thereof with convex lens holding pawls for holding the objective convex lens fitted in the objective convex lens support cylinder.

A spherical binocular according to the present invention will be described hereinafter with reference to the accompanying drawings.

In the drawings, reference numeral 1 designates a pair of hemispherical shells, each of which includes a front opening edge 1a and an outer periphery and has a rectangular cutout 2 formed by partially cutting a portion of the hemispherical shell 1 extending from the front opening edge 1a to the outer periphery. In each of the rectangular cutouts 2 is arranged a support shaft 3 in a manner to laterally extend therein. Also, each of the cutouts 2 has one side of a hinge 4 therein. The hinge 4 is connected on both sides thereof to the support shafts 3, so that the hemispherical shells 1 are pivotally or foldably connected to each other through the hinge 4 and support shafts 3, resulting in cooperating with each other to constitute a sphere which is foldable or openable about the hinge 4.

The hemispherical shells 1 each are formed with an ocular through-hole 5 in a manner to axially extend through a center thereof. The through-hole 5 thus formed through the central portion of the hemispherical shell 1 has an ocular concave lens 6 fittedly arranged therein. Also, each of the hemispherical shells 1 has a front plate 7 fitted in the front opening edge 1a. The front plate 7 is formed at a center thereof with an objective opening 8, in which an objective convex lens 9 is arranged. The objective convex lens 9 and ocular concave lens 6 are arranged so as to positionally correspond to each other or be aligned with each other, resulting in providing a binocular 10.

Each of the hemispherical shells 1 has a holding pawl 11 and a holding groove 12 on the side opposite to the hinge 4. Each holding pawl 11 is attached to the inner surface of the hemispherical shell and projects from the front plate 7, so that the holding pawl 11 of one hemispherical shell 1 and the holding groove 12 of the other hemispherical shell 1 are engaged when the hemispherical shells are closed to provide the sphere. The hinge 4 is formed with a pair of insertion through-holes 13, through which a string 14 for holding or carrying of the spherical binocular is inserted.

Figure 6:
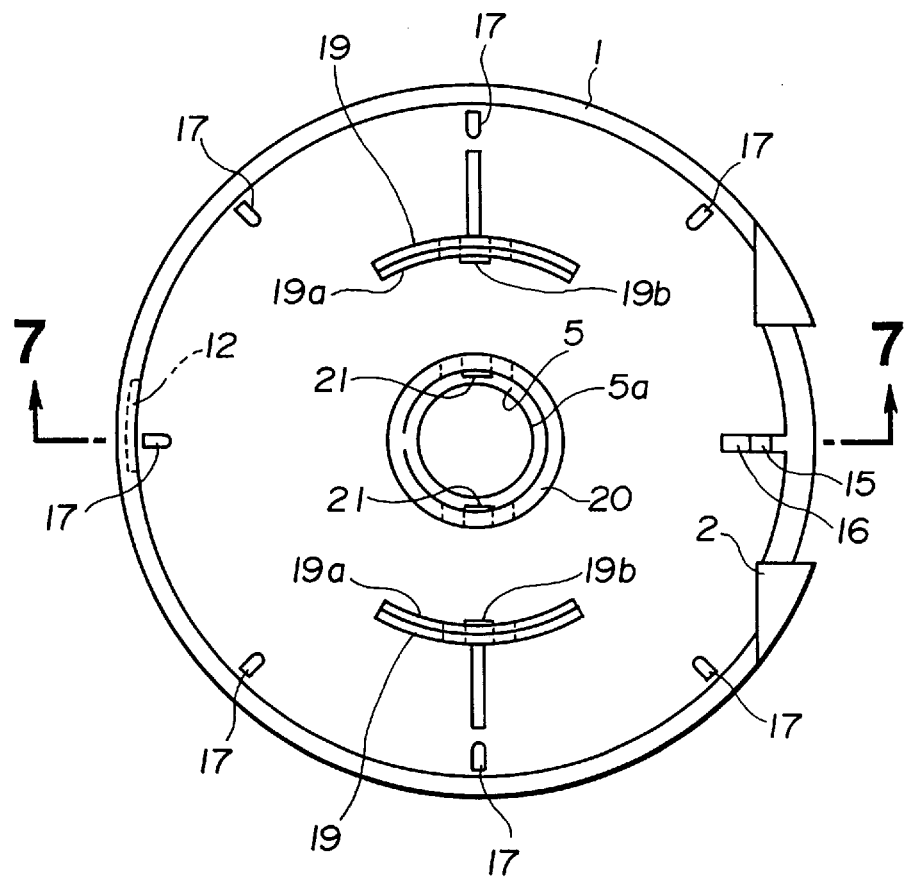
FIG. 6 is a front elevation view showing a hemispherical shell.
Figure 7:
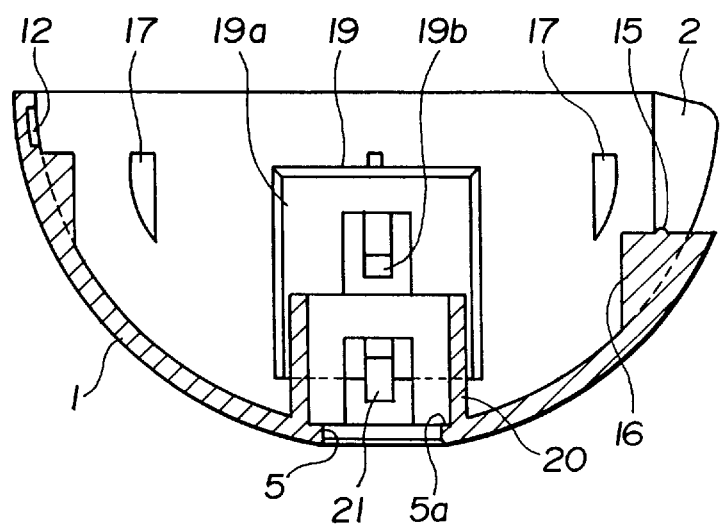
FIG. 7 is a sectional view taken along line C—C of FIG. 6.
Figure 8:
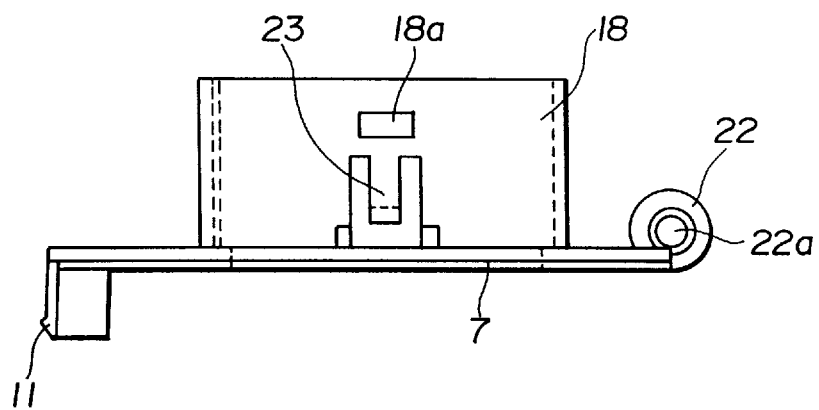
FIG. 8 is a side elevation view showing a front plate.
Figure 9:
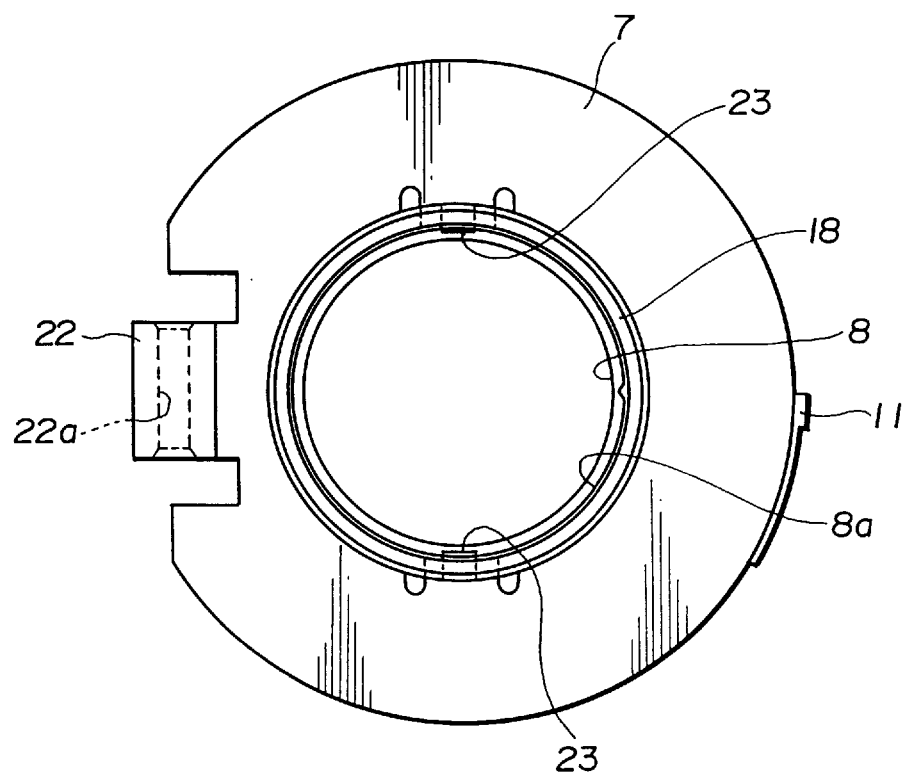
FIG. 9 is a rear elevation view of the front plate shown in FIG. 8.

The above-described rectangular cutout 2 formed at the front opening edge 1a of each of the hemispherical shells 1 is formed during molding or shaping of the shell 1. The front opening edge 1a is provided on an intermediate portion thereof at which the cutout 2 is formed with a projection 16 which includes a projecting distal end 15 for adjustment, as shown in FIG. 6. The projection 16 is arranged so as to radially inwardly extend from the front opening edge 1a.

Also, the hemispherical shells 1 each are provided on an inner surface thereof with a plurality of front plate support projections 17 for supporting the front plate 7 thereon. The front plate support projections 17 are arranged in proximity to the front opening edge 1a and so as to be spaced from each other at predetermined intervals. The front plate support projections 17 each function to support thereon the front plate 7 fitted in the hemispherical shell 1. Also, each of the hemispherical shells 1 is provided on the inner surface thereof with a pair of support cylinder support seats 19 of an arcuate shape so as to be positioned behind the front plate support projections 17 based on the front opening edge 1a. The support cylinder support seats 19 each function to support an objective convex lens support cylinder 18 thereon to hold it on a rear surface of the front plate 7. For this purpose, the support cylinder support seats 19 each include a support cylinder support surface element 19a of an arcuate shape and a support cylinder holding pawl 19b which are arranged for fixedly supporting the objective convex lens support cylinder 18. The support cylinder support surface element 19a and support cylinder holding pawl 19b of each of the support cylinder support seats 19 are arranged so as to project inward from the inner surface of the hemispherical shell 1. The above-described ocular through-hole 5 is formed through the center of the inner surface of the hemispherical shell 1 which is defined at an inmost portion of the inner surface. Correspondingly, an ocular concave lens support cylinder 20 which is formed into a dimension corresponding to a diameter of the through-hole 5 is provided so as to be concentric with the center of the inner surface of the hemispherical shell 1 and so as to inwardly extend from the inner surface. The ocular concave lens support cylinder 20 may be formed into substantially the same inner diameter as the diameter of the through-hole 5 and is provided therein with concave lens holding pawls 21. Thus, the ocular concave lens 6 is fitted in the ocular concave lens support cylinder 20 and held in the cylinder 20 by means of the holding pawls 21 while being abutted against a flange or collar 5a formed at the hemispherical shell 1 so as to surround or define the through-hole or opening 5.

The front plate 7 is formed into an outer diameter sufficient to permit it to be suitably or snugly fitted in the front opening edge 1a of the hemispherical shell 1 and integrally provided at a part of a periphery thereof with a bearing section 22. The bearing section 22 is formed with a bearing hole 22a into which the support shaft 3 is inserted for connecting both hemispherical shells 1 to each other through the hinge 4. The above-described objective convex lens support cylinder 18 is arranged on a side of a rear surface of the front plate 7 so as to outwardly extend therefrom and formed on an outer periphery thereof with holding grooves 18a in a manner to positionally correspond to the support cylinder holding pawls 19b. Also, the objective convex lens support cylinder 18 is provided on an inner peripheral surface thereof with convex lens holding pawls 23 for fixedly pressing the objective convex lens 9 against a flange or collar 8a formed in the objective opening 8.

The manner of assembling of the spherical binocular of the illustrated embodiment constructed as described above will be described hereinafter.

First, the ocular concave lens 6 is inserted into the ocular concave lens support cylinder 20 arranged at the center of the inner surface of each of the hemispherical shells 1 so as to inwardly extend therefrom and then forwardly moved through the holding pawls 21 while forcing them aside, to thereby be abutted against the flange 5a arranged in the through-hole 5. This results in the concave lens holding pawls 21 being returned to the original position to hold the ocular concave lens 6 at a predetermined position in the ocular concave lens support cylinder 20.

The convex lens 9 is inserted into the objective convex lens support cylinder 18 and then abutted against the flange 8a arranged in the objective opening 8, resulting in the convex lens holding pawls 23 being returned to the original position, to thereby hold the objective convex lens 9 at a predetermined position in the objective convex lens support cylinder 18. The support shaft 3 is inserted into the bearing hole 22b of the bearing section 22 of each of the front plates 7 and then the hinge 4 is pivotally fitted on the support shafts 3, so that both front plates 7 may be pivotally connected through the hinge 4. Subsequently, the front plates 7 thus pivotally connected together each are fitted in the corresponding hemispherical shell 1 and then the objective convex lens support cylinder 18 is fitted between the support cylinder support surface elements 19a of the support cylinder support seats 19 projecting from the inner surface of each of the hemispherical shells 1. Each of the front plates 7 is fitted in the front opening edge 1a and abutted at a periphery of the rear surface thereof against the front plate support projections 17. Further, the support cylinder holding pawls 19b of the support cylinder support seats 19 are held in the holding grooves 18a of the objective convex lens support cylinder 18, resulting in the spherical binocular of the illustrated embodiment being assembled.

The two hemispherical shells 1 thus connected to each other are pivotally moved, so that the whole spherical binocular is folded. Thus, the front opening edges 1a of both hemispherical shells 1 are aligned with each other, resulting in the holding pawls being engaged in the corresponding holding grooves while being wholly bent, so that both hemispherical shells 1 may be kept closed together or folded over each other for carrying or storage.

Opening of the spherical binocular thus folded for use is carried out by pushing the holding pawls 11 from the outside to inwardly bend them. This results in the holding pawls 11 being released from engagement with the holding grooves 12, so that both hemispherical shells 1 may be pivotally moved away from each other about the hinge 4.

The spherical binocular folded as described above can be put in a bag, a pocket or the like. Alternatively, it may be hung from the neck for carrying by means of the string 14 inserted via the insertion through-holes 13.

As can be seen from the foregoing, the spherical binocular of the present invention can be substantially varied in configuration during carrying or storage, to thereby exhibit originality and novelty. Also, it permits good viewing of players in motion, is convenient for use and exhibits satisfactory optical characteristics. Further, it prevents the pivotal mechanism such as the foldable hinges and the like from being outwardly projected, to thereby render a contour thereof smooth, resulting in storage and carrying of the binocular being highly facilitated. Moreover, it is compact or small enough to be convenient for carrying. In addition, it exhibits highly improved productivity due to being readily assembled by only fitting and engagement of the parts, resulting in contributing to mass production and cost savings.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A spherical binocular comprising,
    a pair of hemispherical shells each including a front opening edge with a front plate fittedly arranged therein and an outer periphery;
    an ocular concave lens arranged at a central portion of each of said outer peripheries;
    an objective convex lens arranged at a central portion of each of said front plates; and
    a folding means pivotally connecting said hemispherical shells to each other;
    wherein said hemispherical shells provide a rectangular groove formed by cutting a portion thereof extending from said front opening edge to said outer periphery, said folding means being provided in said rectangular groove to provide the spherical shape when said hemispherical shells are closed using the folding means;
    said hemispherical shells each being provided at said front opening edge with a holding pawl so as to be outwardly projected therefrom and on an inside of said front opening edge with a holding groove;
    whereby folding of said pivotally connected two hemispherical shells over each other to align said front opening edges with each other permits said holding pawl and holding groove of one of said hemispherical shells to be respectively fittedly engaged with said holding groove and holding pawl of the other of said hemispherical shells for storage or carrying and inward pressure on said holding pawl of each of said hemispherical shells thus folded permits said holding pawl to be released from engagement with said holding groove for use.

2. A spherical binocular as defined in claim 1, wherein said rectangular groove is formed during molding of said hemispherical shell; and
    said rectangular groove is formed at an intermediate portion thereof with a projection including a projecting distal end for adjustment.

3. A spherical binocular as defined in claim 1, wherein said holding pawl is arranged so as to be outwardly projected from an outer periphery of said front plate; and said holding pawl of one of said hemispherical shells is arranged so as to be alternated with said holding pawl of the other of said hemispherical shells.

4. A spherical binocular comprising:

a pair of hemispherical shells each including a front opening edge with a front plate fittedly arranged therein and an outer periphery, wherein said hemispherical shells provide a rectangular groove formed by cutting a portion thereof extending from said front opening edge to said outer periphery, said hemispherical shells each being provided at said front opening edge with a holding pawl so as to be outwardly projected therefrom and on an inside of said front opening edge with a holding groove, whereby folding of said pivotally connected two hemispherical shells over each other to align said front opening edges with each other permits said holding pawl and holding groove of one of said hemispherical shells to be respectively fittedly engaged with said holding groove and holding pawl of the other of said hemispherical shells for storage or carrying and inward forcing of said holding pawl of each of said hemispherical shells thus folded permits said holding pawl to be released from engagement with said holding groove for use;

an ocular concave lens arranged at a central portion of each of said outer peripheries;

an objective convex lens arranged at a central portion of each of said front plates;

a folding means pivotally connecting said hemispherical shells to each other, wherein said folding means provides a support shaft arranged in each of said rectangular grooves so as to laterally extend therein; and a hinge having both sides each received in each of said rectangular groove and pivotally mounted on each of said support shafts, resulting in foldably connecting said hemispherical shells to each other.

5. A spherical binocular as defined in claim 4, wherein said front plate is formed into a diameter which permits said front plate to be snugly fitted in said front opening edge and integrally provided at a part of a periphery thereof with a bearing section formed with a bearing hole in which said support shaft is supported;

said objective convex lens support cylinder being arranged on a rear side of said front plate so as to be inwardly projected therefrom;

said hemispherical shell being formed on the inner surface thereof with support cylinder holding pawls and said objective convex lens support cylinder being provided on an outer surface thereof with holding grooves so as to positionally correspond to said support cylinder holding pawls;

said objective convex lens support cylinder being provided on an inner surface thereof with convex lens holding pawls for holding said objective convex lens fitted in said objective convex lens support cylinder.

6. A spherical binocular as defined in claim 4, wherein said hinge is formed with insertion through-holes via which a string for holding or carrying of the spherical binoculars is inserted.

7. A spherical binocular comprising:

a pair of hemispherical shells each including a front opening edge with a front plate fittedly arranged therein and an outer periphery, wherein said hemispherical shells provide a rectangular groove formed by cutting a portion thereof extending from said front opening edge to said outer periphery, said hemispherical shells each being provided at said front opening edge with a holding pawl so as to be outwardly projected therefrom and on an inside of said front opening edge with a holding groove, whereby folding of said pivotally connected two hemispherical shells over each other to align said front opening edges with each other permits said holding pawl and holding groove of one of said hemispherical shells to be respectively fittedly engaged with said holding groove and holding pawl of the other of said hemispherical shells for storage or carrying and inward forcing of said holding pawl of each of said hemispherical shells thus folded permits said holding pawl to be released from engagement with said holding groove for use;

an ocular concave lens arranged at a central portion of each of said outer peripheries;

an objective convex lens arranged at a central portion of each of said front plates; and a folding means pivotally connecting said hemispherical shells to each other;

wherein said hemispherical shells each are provided on a portion of an inner surface thereof in proximity to said front opening edge with front plate support projections to be spaced from each other at predetermined intervals, to thereby support thereon said front plate fitted in said hemispherical shell;

said hemispherical shells each are provided on the inner surface thereof with a pair of support cylinder support seats of an arcuate shape to be positioned behind said front plate support projections based on said front opening edge;

said support cylinder support seats each supporting an objective convex lens support cylinder thereon to hold it on a rear surface of said front plate;

said objective convex lens being supported in said objective convex lens support cylinder;

said support cylinder support seats each including a support cylinder support surface element of an arcuate shape and a support cylinder a holding pawl which are arranged for fixedly supporting said objective convex lens support cylinder; and said hemispherical shells each are provided on the inner surface thereof with an ocular concave lens support cylinder to be inwardly projected therefrom and so as to be aligned with said ocular through-hole;

said ocular concave lens support cylinder being formed into an inner diameter corresponding to said ocular through-hoe;

said ocular concave lens support cylinder being provided therein with concave lens holding pawls for holding said ocular concave lens in said ocular concave lens support cylinder.

* * * * *